US011214332B2

(12) United States Patent
Lin et al.

(10) Patent No.: US 11,214,332 B2
(45) Date of Patent: Jan. 4, 2022

(54) HUB APPARATUS AND ASSOCIATED SYSTEMS

(71) Applicant: Gogoro Inc., Hong Kong (CN)

(72) Inventors: Shih-Yuan Lin, Taipei (TW); Yu-Se Liu, New Taipei (TW); Po-Chang Yeh, Taoyuan (TW); Liang-Yi Hsu, Miaoli (TW); Chen-Hsin Hsu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 432 days.

(21) Appl. No.: 16/206,810

(22) Filed: Nov. 30, 2018

(65) Prior Publication Data

US 2019/0185106 A1 Jun. 20, 2019

Related U.S. Application Data

(60) Provisional application No. 62/593,854, filed on Dec. 1, 2017, provisional application No. 62/650,895, filed on Mar. 30, 2018.

(51) Int. Cl.
*H02K 5/04* (2006.01)
*H02K 21/22* (2006.01)
(Continued)

(52) U.S. Cl.
CPC .............. *B62M 6/60* (2013.01); *B60B 1/003* (2013.01); *B60B 27/04* (2013.01); *B60L 50/20* (2019.02);
(Continued)

(58) Field of Classification Search
CPC ........ H02K 1/2786; H02K 1/187; H02K 1/28; H02K 7/1846; H02K 5/04; H02K 7/006;
(Continued)

(56) References Cited

U.S. PATENT DOCUMENTS 502,500 A 8/1893 Perkins
748,684 A 1/1904 Andersen et al.
(Continued)

FOREIGN PATENT DOCUMENTS

CN 1275508 A 12/2000
CN 1561568 A 1/2005
(Continued)

OTHER PUBLICATIONS

Office Action received for co-pending Chinese Application No. CN 201811450003.X, Applicant: Gogoro Inc. dated Mar. 23, 2020, 10 pages.
(Continued)

*Primary Examiner* — Quyen P Leung
*Assistant Examiner* — Alexander Moraza
(74) *Attorney, Agent, or Firm* — Perkins Coie LLP

(57) ABSTRACT

The present disclosure relates to hub apparatuses and associated systems. An embodiment of the hub apparatus includes a rotor assembly, a shaft, and a stator assembly. The rotor assembly includes first/second housing components and multiple magnets mounted on one or both of the first and second housing components. The stator assembly includes (1) a coil assembly positioned corresponding to the magnets; (2) a main circuit board fixedly coupled to the coil assembly; and (3) a battery assembly positioned inside the coil assembly and carried by the main circuit board.

19 Claims, 15 Drawing Sheets

(51) Int. Cl.

| | |
|---|---|
| *H02K 11/30* | (2016.01) |
| *B62M 6/60* | (2010.01) |
| *B62M 6/50* | (2010.01) |
| *H02K 7/00* | (2006.01) |
| *H02K 5/10* | (2006.01) |
| *H02K 7/12* | (2006.01) |
| *H02K 11/00* | (2016.01) |
| *B62M 6/65* | (2010.01) |
| *B62M 6/90* | (2010.01) |
| *B60B 1/00* | (2006.01) |
| *H02K 11/24* | (2016.01) |
| *B60L 50/20* | (2019.01) |
| *B60L 50/60* | (2019.01) |
| *B60B 27/04* | (2006.01) |
| *H02K 11/33* | (2016.01) |
| *B60L 53/16* | (2019.01) |
| *H02K 1/18* | (2006.01) |
| *B60L 53/12* | (2019.01) |
| *B60L 53/30* | (2019.01) |
| *H02K 1/27* | (2006.01) |
| *B60B 1/04* | (2006.01) |
| *H02K 7/14* | (2006.01) |

(52) U.S. Cl.
CPC .............. *B60L 50/60* (2019.02); *B60L 50/66* (2019.02); *B60L 53/12* (2019.02); *B60L 53/16* (2019.02); *B60L 53/305* (2019.02); *B62M 6/50* (2013.01); *B62M 6/65* (2013.01); *B62M 6/90* (2013.01); *H02K 1/187* (2013.01); *H02K 5/10* (2013.01); *H02K 7/006* (2013.01); *H02K 7/12* (2013.01); *H02K 11/0094* (2013.01); *H02K 11/24* (2016.01); *H02K 11/33* (2016.01); *H02K 21/22* (2013.01); *B60B 1/042* (2013.01); *B60L 2200/12* (2013.01); *B60L 2220/44* (2013.01); *B60L 2240/42* (2013.01); *H02K 1/2786* (2013.01); *H02K 7/14* (2013.01); *H02K 11/30* (2016.01); *H02K 2211/03* (2013.01)

(58) Field of Classification Search
CPC .......... H02K 7/12; B60B 1/003; B60B 1/042; B60B 27/04; B60L 2200/12; B60L 2220/44; B60L 2240/42; B60L 50/20; B60L 50/60; B60L 50/66; B60L 53/12; B60L 53/16; B60L 53/305; B62M 6/50; B62M 6/60; B62M 6/65; B62M 6/90; B62J 6/12
USPC ..... 310/67 A, 67 R, 75 C, 89, 402–409, 156
See application file for complete search history.

(56) References Cited

U.S. PATENT DOCUMENTS

| | | | |
|---|---|---|---|
| 4,019,782 A | 4/1977 | Reppert | |
| 5,795,036 A | 8/1998 | Campagnolo | |
| 5,920,193 A * | 7/1999 | Tola | F16C 33/723 324/173 |
| 6,057,657 A * | 5/2000 | Kitamura | B62H 5/08 318/16 |
| 6,617,746 B1 | 9/2003 | Maslov et al. | |
| 6,765,323 B2 | 7/2004 | Takano et al. | |
| 6,787,951 B2 | 9/2004 | Maslov et al. | |
| 7,156,196 B2 | 1/2007 | Katsaros | |
| 7,182,410 B2 | 2/2007 | Fukui | |
| 7,273,259 B2 | 9/2007 | Fukui | |
| 7,284,631 B2 | 10/2007 | Rizzetto | |
| 7,370,720 B2 | 5/2008 | Kokatsu et al. | |
| 7,375,450 B2 | 5/2008 | Tanaka et al. | |
| 7,540,571 B2 * | 6/2009 | Yamaguchi | B60T 1/005 188/162 |
| 8,960,354 B2 | 2/2015 | Lin et al. | |
| 9,120,533 B2 | 9/2015 | Zanfei et al. | |
| 9,669,897 B2 | 6/2017 | Zanfei | |
| 9,821,597 B2 | 11/2017 | Koshiyama et al. | |
| 9,925,826 B2 | 3/2018 | Koshiyama et al. | |
| 9,962,991 B2 | 5/2018 | Koshiyama et al. | |
| 10,500,950 B2 | 12/2019 | Wu | |
| 2002/0156577 A1 | 10/2002 | Flick | |
| 2003/0062782 A1 | 4/2003 | Takano et al. | |
| 2003/0193264 A1* | 10/2003 | Pyntikov | H02K 1/141 310/254.1 |
| 2003/0213630 A1* | 11/2003 | Pyntikov | B60L 50/64 180/220 |
| 2004/0164624 A1 | 8/2004 | Suzuki et al. | |
| 2007/0252452 A1 | 11/2007 | Ishimoto et al. | |
| 2011/0133542 A1 | 6/2011 | Ratti et al. | |
| 2011/0304235 A1 | 12/2011 | Hashiba et al. | |
| 2012/0161495 A1 | 6/2012 | Ito | |
| 2012/0169154 A1 | 7/2012 | Curodeau | |
| 2013/0049549 A1 | 2/2013 | Folmli et al. | |
| 2013/0068549 A1 | 3/2013 | Laprade | |
| 2013/0207448 A1 | 8/2013 | Koshiyama et al. | |
| 2013/0328512 A1 | 12/2013 | Ozaki | |
| 2014/0035347 A1 | 2/2014 | Zanfei et al. | |
| 2015/0020621 A1* | 1/2015 | Kawakami | B62M 3/003 74/47 |
| 2015/0298537 A1 | 10/2015 | Duhamel et al. | |
| 2016/0009169 A1 | 1/2016 | Biderman et al. | |
| 2016/0014252 A1 | 1/2016 | Biderman et al. | |
| 2016/0068223 A1 | 3/2016 | Zanfei | |
| 2016/0075225 A1 | 3/2016 | Aich et al. | |
| 2016/0082772 A1* | 3/2016 | Biderman | B60Q 9/00 301/6.5 |
| 2016/0149167 A1 | 5/2016 | Jung | |
| 2016/0159435 A1 | 6/2016 | Yehuda et al. | |
| 2016/0243927 A1 | 8/2016 | Biderman et al. | |
| 2016/0280300 A1 | 9/2016 | Latzke | |
| 2017/0297616 A1 | 10/2017 | Kikuchi et al. | |
| 2017/0368943 A1 | 12/2017 | Von Novak, III et al. | |
| 2018/0111487 A1 | 4/2018 | Xu et al. | |
| 2019/0173399 A1 | 6/2019 | Lin et al. | |
| 2019/0202526 A1 | 7/2019 | Lin et al. | |
| 2019/0315241 A1 | 10/2019 | Lin et al. | |
| 2020/0114753 A1 | 4/2020 | Siderman et al. | |

FOREIGN PATENT DOCUMENTS

| | | |
|---|---|---|
| CN | 1652969 A | 8/2005 |
| CN | 204279852 U | 4/2015 |
| JP | 10-324288 A | 12/1998 |
| JP | 11-227668 A | 8/1999 |
| JP | 2000-62663 A | 2/2000 |
| JP | 2001-122184 A | 5/2001 |
| JP | 4009638 B2 | 11/2007 |
| KR | 20170106788 A | 9/2017 |
| TW | 449559 B | 8/2001 |
| TW | M503022 | 6/2015 |
| WO | 2003097437 A1 | 11/2003 |
| WO | 2012123802 A1 | 9/2012 |
| WO | 2015154046 A1 | 10/2015 |

OTHER PUBLICATIONS

Indian Office Action received for Indian Patent Application No. IN201814045100, Applicant: Gogoro Inc. dated Jun. 23, 2020, 8 pages.

Office Action received for Taiwanese Patent Application No. TW107143121; Applicant: Gogoro Inc., dated Aug. 18, 2019, 18 pages.

Office Action received for co-pending Taiwanese application No. TW107143121, Applicant: Gogoro Inc. dated Dec. 24, 2019, 20 pages.

Non-Final Office Action received for co-pending U.S. Appl. No. 16/207,068, Applicant: Gogoro Inc., dated Mar. 20, 2020, 18 pages.

(56) References Cited

OTHER PUBLICATIONS

Office Action received for co-pending Japanese Patent Application No. JP2018-224712; Applicant: Gogoro Inc., dated Dec. 3, 2019, 12 pages.
European Search Report Received for European Patent Application No. EP18209485.4; Applicant: Gogoro Inc., dated Apr. 18, 2019, 5 pages.

* cited by examiner

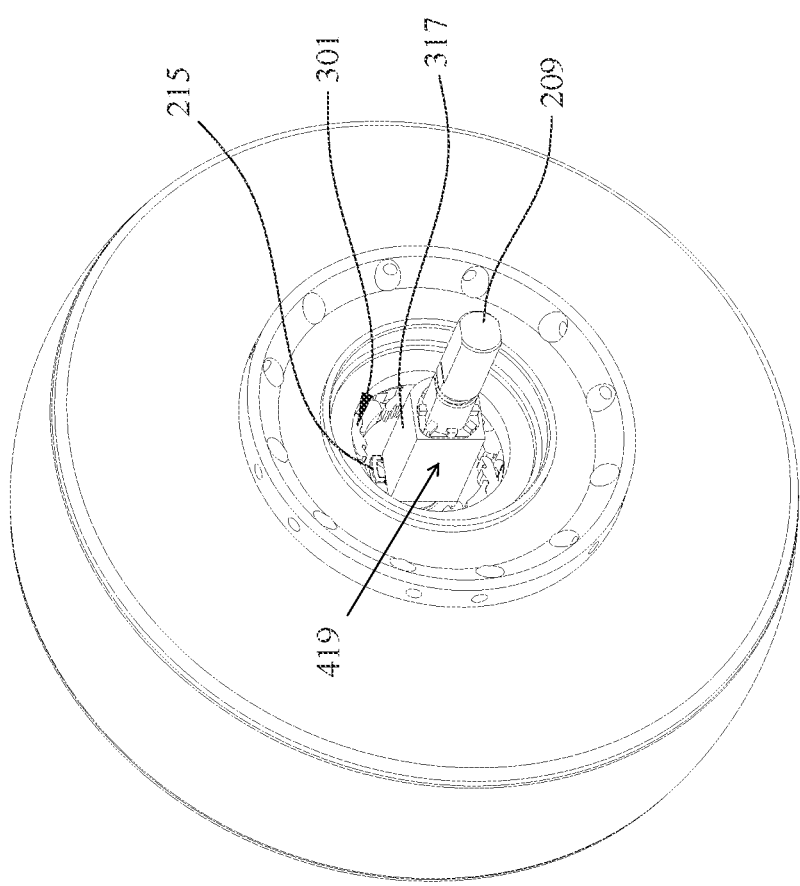

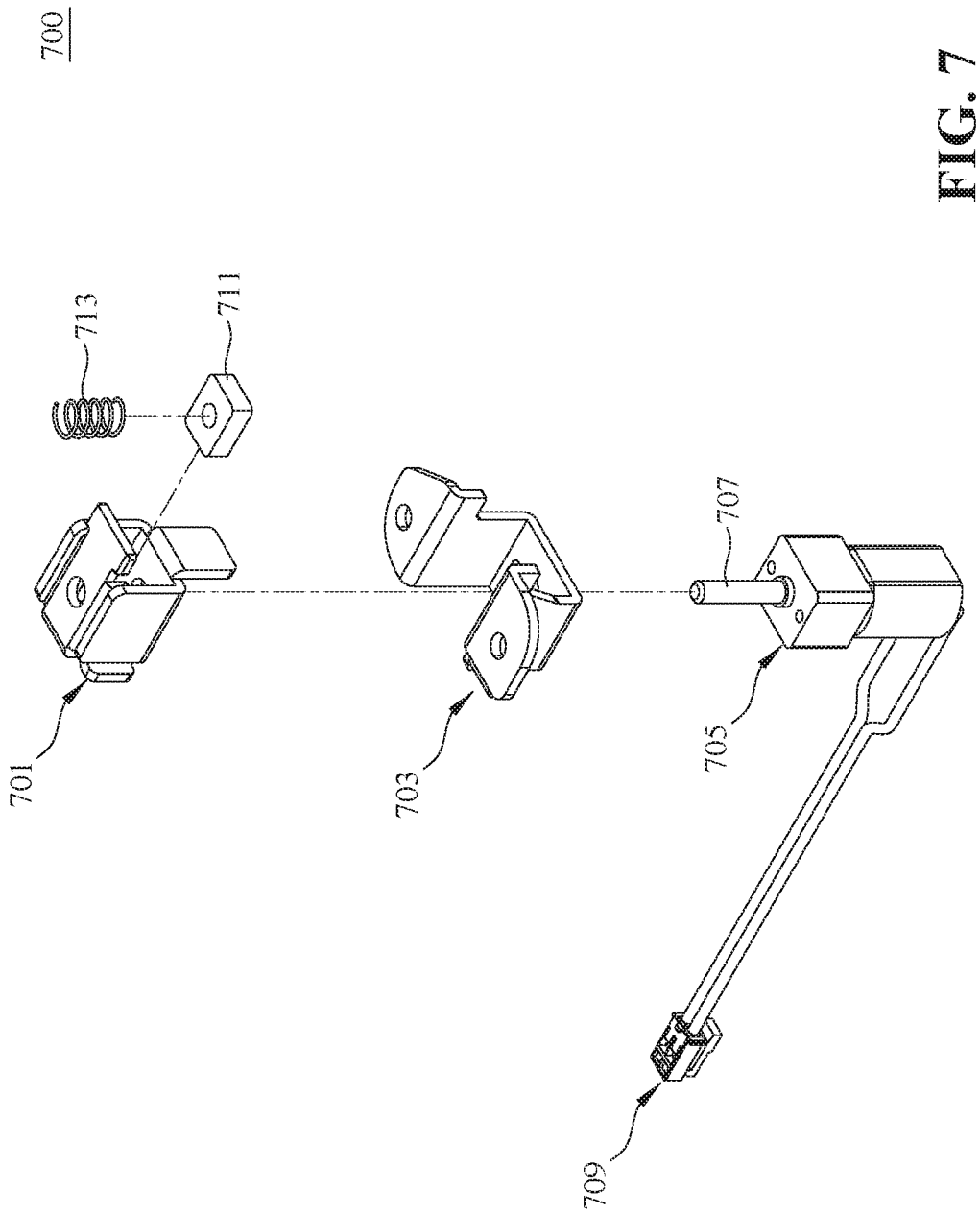

HUB APPARATUS AND ASSOCIATED SYSTEMS

CROSS-REFERENCE TO RELATED APPLICATION

The present application claims the benefit of and priority to U.S. Provisional Applications No. 62/593,854, filed Dec. 1, 2017, and No. 62/650,895, filed Mar. 30, 2018, which are incorporated herein by reference in their entirety.

TECHNICAL FIELD

The present technology is directed to a hub apparatus or hub assembly. More particularly, the present technology is directed to a compact hub apparatus configured to drive or rotate a wheel of a vehicle.

BACKGROUND

In modern cities, transportation relying on personal vehicles can result in significant amount of traffic and pollution. One solution to this problem is to encourage people to use vehicles with a compact design. Some conventional compact vehicles, such as a bicycle, require human power and are not convenient for users under certain circumstances. For example, it can be challenging for a user to climb up hills or ride long distance. Therefore, there is a need for improved vehicle designs that will increase the ease of use and improve performance.

BRIEF DESCRIPTION OF THE DRAWINGS

FIGS. 3a and 3b illustrate components of a torque sensor in accordance with embodiments of the present technology.

FIGS. 7-10b illustrate a locking device in accordance with embodiments of the present technology.

Figure 1:
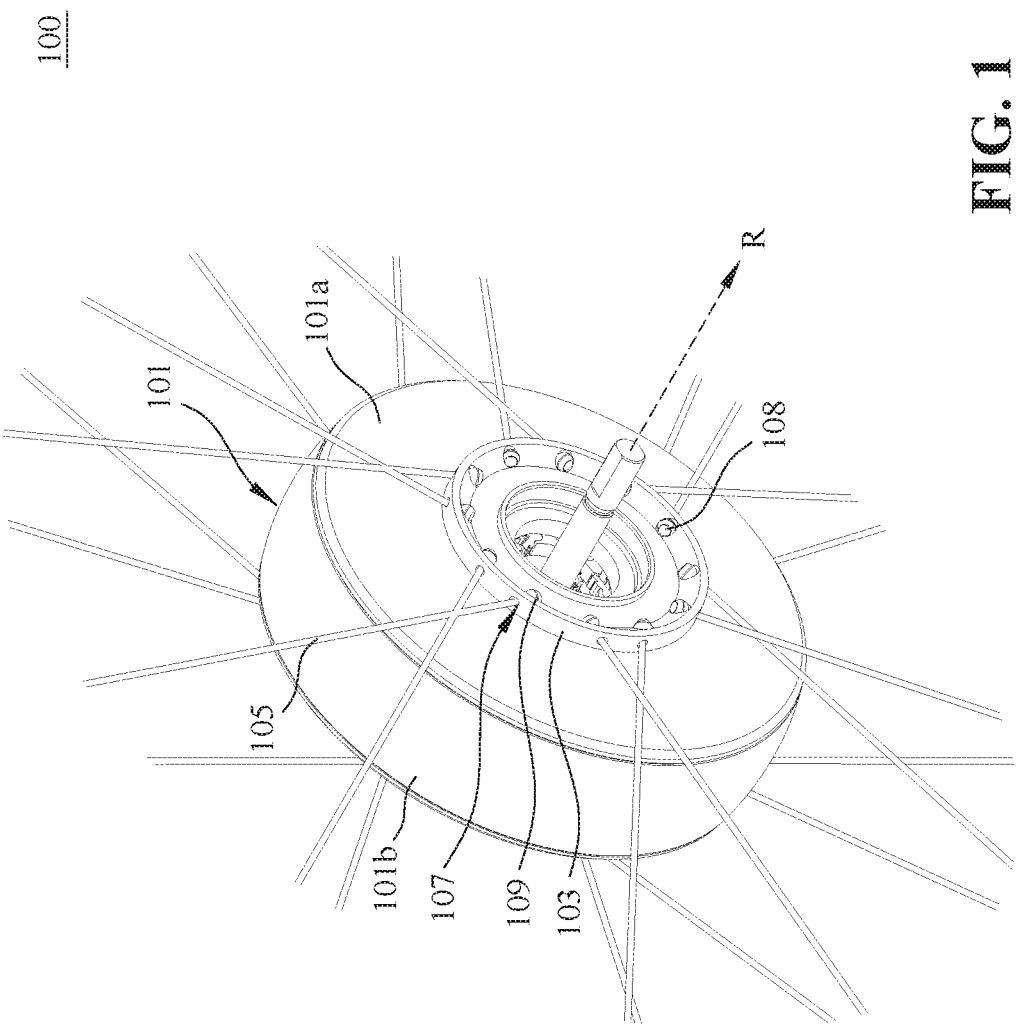
FIG. 1 illustrates a hub apparatus in accordance with embodiments of the present technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

The present technology is directed to a hub apparatus configured to rotate a wheel/rim of a vehicle (e.g., a bicycle, a tricycle, a scooter, a powered wheel chair, a cart, etc.). The hub apparatus includes a rotor assembly, a shaft assembly, and a stator assembly. The stator assembly is fixedly coupled to the shaft, and the shaft extends through the rotor assembly. The rotor assembly can be rotated relative to the stator assembly and the shaft. In some embodiments, the hub apparatus can be considered as an electric motor. The rotor assembly of the hub apparatus is coupled to the wheel/rim of the vehicle, and the shaft is fixedly coupled to the vehicle (e.g., a vehicular structure such as a frame). The hub apparatus is configured to rotate the wheel either with or without human power to move (or at least facilitate the movement of) the vehicle.

In some embodiments, the present technology is directed to a hub apparatus with a compact design that enables a user to carry the hub apparatus conveniently. The present hub apparatus also has a modular design that allows easy, quick installation and provide access for maintenance. For example, a side cover (e.g., FIG. 11) of the hub apparatus can be readily removed and provide access to the inside the hub apparatus.

Advantages of the present technology include, for example, (1) it provides a compact hub-shaped electric motor having a rotor assembly and a stator assembly; (2) most of the components (e.g., a battery pack, a main circuit board, a controller, etc.) of the present hub apparatus are positioned inside the stator assembly and are thus not rotating with the rotor assembly. This is beneficial for the components' life expectancies and reliabilities.

FIG. 1 is an isometric view of a hub apparatus or hub assembly 100 in accordance with embodiments of the present technology. As shown in FIG. 1, the hub apparatus 100 includes an outer housing (or housing) and a hub flange (or ring structure) 103 configured to accommodate multiple spokes 105 (e.g., the other end of the spoke 105 can be coupled to a front/back wheel of a bike).

In some embodiments, the housing can be assembled from multiple housing components. In some embodiments, the housing can include a first housing component 101 and a second housing component 201 coupled to each other and together form an inner/interior/internal space to accommodate elements of the hub apparatus 100. In some embodiments, for example, the first housing component 101 can include a sidewall 101a and an outer rim 101b extending around the outer circumference of the sidewall 101a. The outer rim 101b has a height that defines the interior space in the first housing component 101.

As shown in FIG. 1, the first housing component 101 is formed with a side opening in its center, allowing a shaft (e.g., shaft 209 in FIG. 2) to pass through. The opening is configured to accommodate a side cover 1102 (see e.g., FIG. 11). The side cover 1102 is fixedly coupled to the shaft and accordingly does not rotate with the housing. In some embodiments, a bearing can be positioned between the side cover 1102 and the housing, which enables the housing to rotate relative to the side cover 1102 (and the shaft 209). In some embodiments, an oil seal can be positioned between the housing and the side cover 1102.

Figure 2:
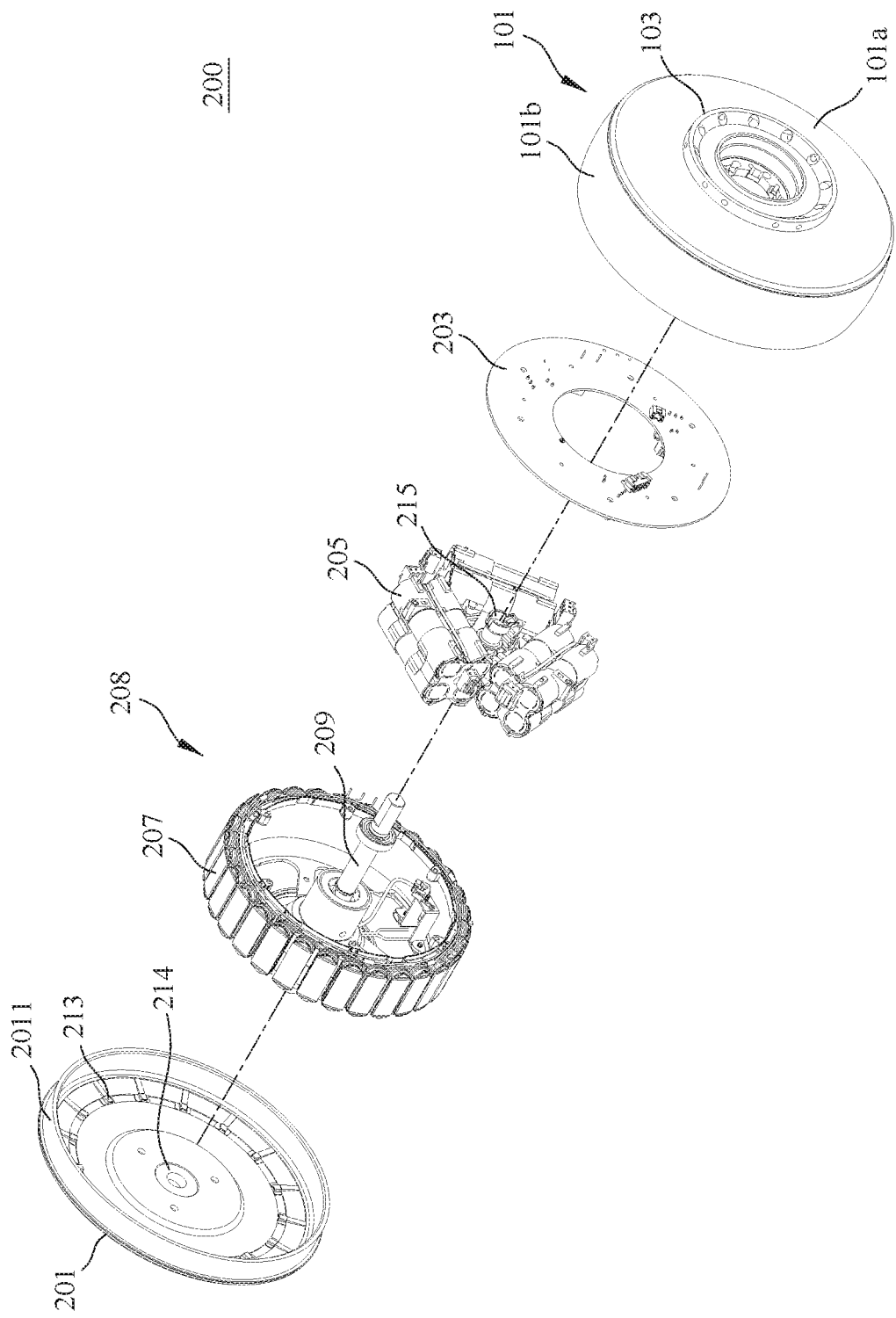
FIG. 2 illustrates an exploded view of a hub apparatus in accordance with embodiments of the present technology.

As shown in FIG. 1, the hub flange 103 or ring structure is coupled to, or integrally formed with, the sidewall 101a. The hub flange 103 extends outwardly from a surface of the sidewall 101a at a position radially outward from a center point of the first housing component 101. A second housing component 201 (e.g., a lid or cap; FIG. 2) encloses the open end of the first housing component 101 with a structure that fits underneath the outer rim 101b of the first housing component 101. In some embodiments, the second housing component 201 can include an insertion flange 2011 formed thereon. The insertion flange 2011 is configured to couple the second housing component 201 to the first housing component 101 (e.g., to be inserted into a gap, to be discussed below with reference to FIG. 5). In some embodiments, a bearing or oil seal 214 (FIG. 2) can be positioned between the second housing component 201 and the shaft 209. The bearing 214 is configured to facilitate the relative rotation between the second housing component 201 and the shaft 209.

As best shown in FIG. 2, fitted into the interior space of the housing are a main circuit board 203, a battery assembly 205, and a coil assembly 207 that are fixedly directly or indirectly to an axle or shaft 209 passing through the center of the hub assembly 100. In such embodiments, the first housing component 101 and a number of magnets 508 (not visible in FIG. 1 or 2; see e.g., FIG. 5) on the interior of the first housing component 101 together form a rotor assembly. Further, the main circuit board 203, the battery assembly 205, and the coil assembly 207 together can be considered as the stator assembly 208.

When an electric current provided by battery packs of the battery assembly 205 passes through coils (or coil assembly 207) of the stator assembly 208, magnetic fields are generated and accordingly move the magnets 508 of the rotor assembly to rotate the rotor assembly about axis R (or shaft 209). In some embodiments, an additional battery pack can be positioned external to the hub apparatus 100 as a backup, supplementary power supply. As a result, the housing and a wheel attached to the housing via the spokes 105 are also rotated to move a scooter, a bicycle, or a vehicle.

In the illustrated embodiment, the hub flange 103 or ring structure and the sidewall 101a are concentrically positioned. The hub flange 103 is positioned around a center point of the sidewall 101a. In other embodiments, the hub flange 103 can be positioned at different radial locations of the sidewall 101a (e.g., closer to the outer edge of the housing or nearer to the center point). As shown, the hub flange 103 includes a plurality of openings 107 configured to receive the ends of the multiple spokes 105, respectively.

Each spoke 105 has an outer end configured to couple to a wheel/rim structure (not shown in FIG. 1) and an inner, flared (or spherical) end 109 that seats against a correspondingly shaped recess formed in an interior circumference of the hub flange 103. In one embodiment, a spherical washer 108 is fitted over the spoke 105 and rests against the flared end of the spoke 105. Correspondingly shaped spherical recesses are formed in the hub flange 103 to receive the spherical washer 108 and seat the spoke 105 under tension.

In addition, because the spherical washer 108 allows the spoke 105 to be in contact with the hub flange 103 at various angles, the present structure (1) improves manufacturing flexibility (e.g., they are easy to fit and have a higher error tolerance) and (2) provides additional durability when operating the hub apparatus 100 at least because the spokes 105 are not rigidly secured to the hub flange 103 at their ends.

FIG. 2 is an exploded view showing a hub apparatus 200 in accordance with embodiments of the present technology. The hub apparatus 200 includes the first housing component 101 (which has the sidewall 101a and the outer rim 101b) and the lid or cap or second housing component 201. On its outer surface, the first housing component 101 includes the hub flange 103 configured to couple to a wheel/rim structure via multiple spokes. On its inner surface, the second housing component 201 includes multiple protrusions or stopping bumps 213 configured to stop the relative rotation (e.g., by cooperating with a locking device 700 or a motor locking device discussed below with reference to FIG. 7) between the housing and the coil assembly 207. The multiple protrusions or stopping bumps 213 can be named as "engaging portions." In some embodiments, the first housing component 101 and the lid or the second housing component 201 together form a housing assembly.

In some embodiments, the engaging portion can be implemented as a recess (e.g., configured to receive the locking device 700), a hook (e.g., configured to engage the lock the locking device 700), and other suitable components. In some embodiments, the engaging portions are located on the interior surface of the sidewall 101a of the first housing component 101, and/or on the interior surface of the second housing component 201. The engaging portion and the locking device 700 together form a "locking mechanism" or "locking system" for the hub apparatus 200.

In the illustrated embodiment, multiple magnets 508 (see e.g., FIG. 5) are circumferentially positioned on the inner surface of the outer rim 101b, and accordingly the first housing component 101, the second housing component 201, and the magnets 508 together act as a "rotor assembly" or a rotor in this embodiment.

The main circuit board 203 is configured to carry one or more controllers, controlling circuits, logic, sensors, wiring, and/or other suitable components necessary to apply current to the coils or to rotate the housing. In some embodiments, the main circuit board 203 can carry an electrical control unit (ECU) of a vehicle. In some embodiments, the main circuit board 203 can carry a power controller (not shown) configured to control the power output of the hub apparatus 200. The power output can be measured in form of the torque force of rotation between the rotor assembly (the housing with the magnets 508 positioned therein or on its inner surface) and the stator assembly 208 or by the watts expended by the motor. In some embodiments, the main circuit board 203 can carry drive circuitry configured to manage the power from the battery assembly 205 (e.g., to supply a three-phase alternating current). In some embodiments, the drive circuitry and the power controller can be integrated in one component (e.g., a motor control unit, MCU).

The battery assembly 205 can include multiple battery packs. In the illustrated embodiments, the battery assembly 205 includes three battery packs laterally positioned adjacent to the main circuit board 203. In other embodiments, the battery assembly 205 can have different numbers of battery packs arranged in various ways. In some embodiments, the battery assembly 205 can include multiple battery packs positioned to form a polygon (e.g., a triangle, a rectangle, a pentagon, a hexagon, etc.) in a reference plane generally perpendicular to the shaft 209 (e.g., in such embodiments, the longitudinal direction of the battery packs lies in the reference plane). In some embodiments, the battery pack can be positioned at equal angles around the shaft 209. In some embodiments, the battery packs can be arranged based on the size/shape of the battery packs so as to be fitted into the coil assembly 207. For example, the battery packs can have orientations different from those shown in FIG. 2.

In some embodiments, the battery assembly 205 can be controlled or managed by a battery management system (BMS). The BMS can include one or more sensors configured to monitor the status of a battery. In some embodiments, the BMS can be positioned on the main circuit board 203. In some embodiments, the battery packs (and battery cells therein) can be connected in series or in parallel, depending on various needs or actual designs.

In some embodiments, the battery assembly 205 can be coupled to one or more battery memories positioned on the main circuit board 203 and configured to store battery-related information (e.g., battery usage information, battery operating instructions (such as charging/discharging rates or other instructions that may vary from different batteries), battery firmware, battery status, etc.). In some embodiments, the battery memory can also be configured to store vehicle information (e.g., an operating temperature in the hub apparatus 200) or user information (e.g., driving/riding history, habits, etc.). In some embodiments, the battery memories can be positioned inside a battery housing of the battery assembly 205.

In some embodiments, the battery assembly 205 can be positioned inside the coil assembly 207 such that the hub apparatus 200 can have a compact design. Benefits of positioning the battery assembly 205 inside the coil assembly 207 include, for example, (1) the coil assembly 207 can protect the battery assembly 205, for example, from impacts from the outside; and (2) this arrangement can at least partially prevent or impede the battery assembly 205 from interference/influence of the magnetic field generated by the magnets of the rotor assembly.

The axle or shaft 209 is fixedly coupled to the main circuit board 203, the battery assembly 205, and the coil assembly 207. The shaft 209 can be coupled to a vehicular body (e.g., a frame, a chassis, structural parts, etc.) and support the same. During operation, the housing and the wheel attached thereto (via the spokes coupled to the hub flanges) can rotate relative to the shaft 209 to move the vehicular body. In some embodiments, the shaft 209 can be coupled to a front wheel component (e.g., a front wheel fork) or a rear wheel component (e.g., a rear wheel frame).

In some embodiments, the hub apparatus 200 can include one or more waterproof components (e.g., O-rings) configured to make the hub apparatus 200 waterproof. In some embodiments, the waterproof component can be positioned at one or more locations such as a location adjacent to the shaft 209, a location adjacent to a component (e.g., an internal torque sensor 317 to be discussed below with reference to FIG. 3a, an external torque sensor component 419 to be discussed below with reference to FIG. 4a) of the hub apparatus 200, etc. In some embodiments, the waterproof component can also be positioned between the first housing component 101 and the second housing component 201, at one or both ends of the shaft 209, between the side cover 1102 and the first housing component 101 and the second housing component 201, etc. so as to enhance the overall waterproof capability of the hub apparatus 200.

In some embodiments, the shaft 209 can be coupled to a torque sensor jacket 215 configured to protect a torque sensor and/or to facilitate the installation of the torque sensor. For example, the torque sensor jacket 215 is configured to facilitate mounting a wire attached to the torque sensor to the shaft 209. The embodiments of the torque sensor jacket 215 and the torque sensor are discussed below with reference to FIGS. 3a-4b.

Figure 3A:
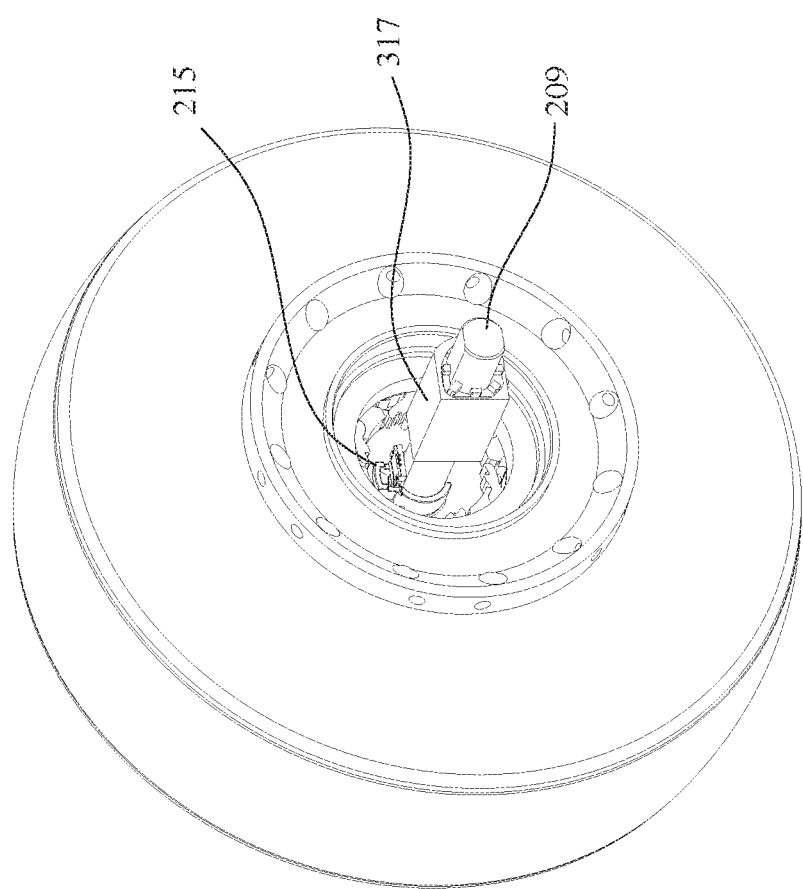

FIGS. 3a and 3b illustrate how an internal torque sensor component 317 is coupled to the torque sensor jacket 215. As shown, the internal torque sensor component 317 is coupled to the shaft 209 first (e.g., by inserting the shaft 209 into an opening of the internal torque sensor component 317) and then is moved or slid toward the torque sensor jacket 215. After a proper wire/cable connecting (e.g., couple a cable of the internal torque sensor component 317 to a controller on the main circuit board 203), the internal torque sensor component 317 can be pushed and fixedly coupled to the torque sensor jacket 215.

Figure 4A:
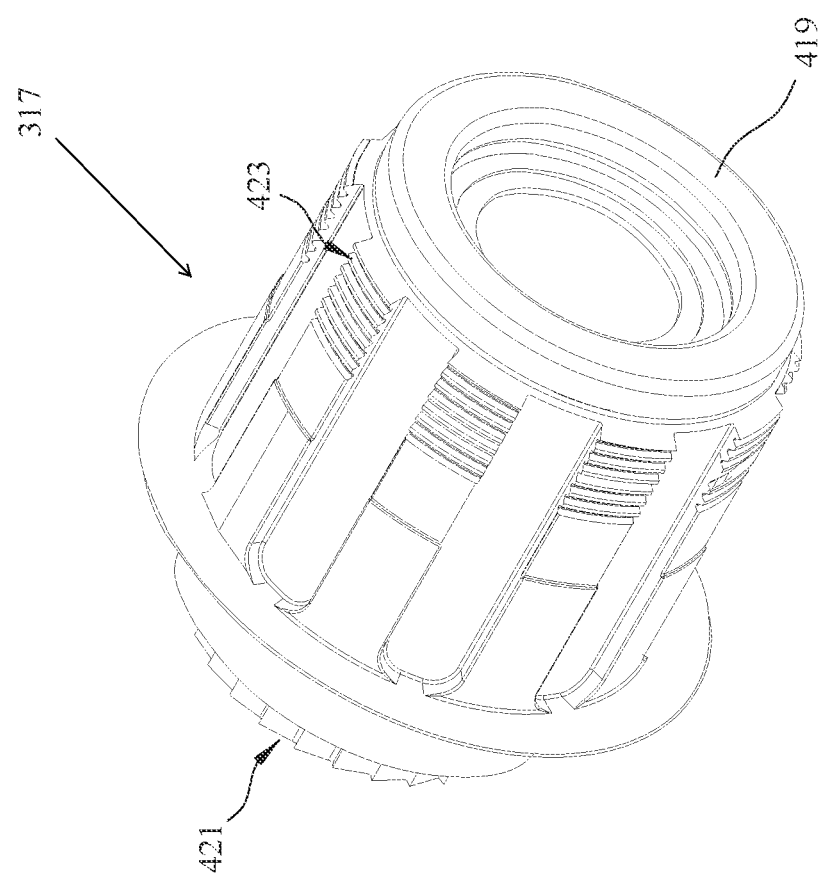
FIGS. 4a and 4b illustrate components of a torque sensor in accordance with embodiments of the present technology.
Figure 4B:
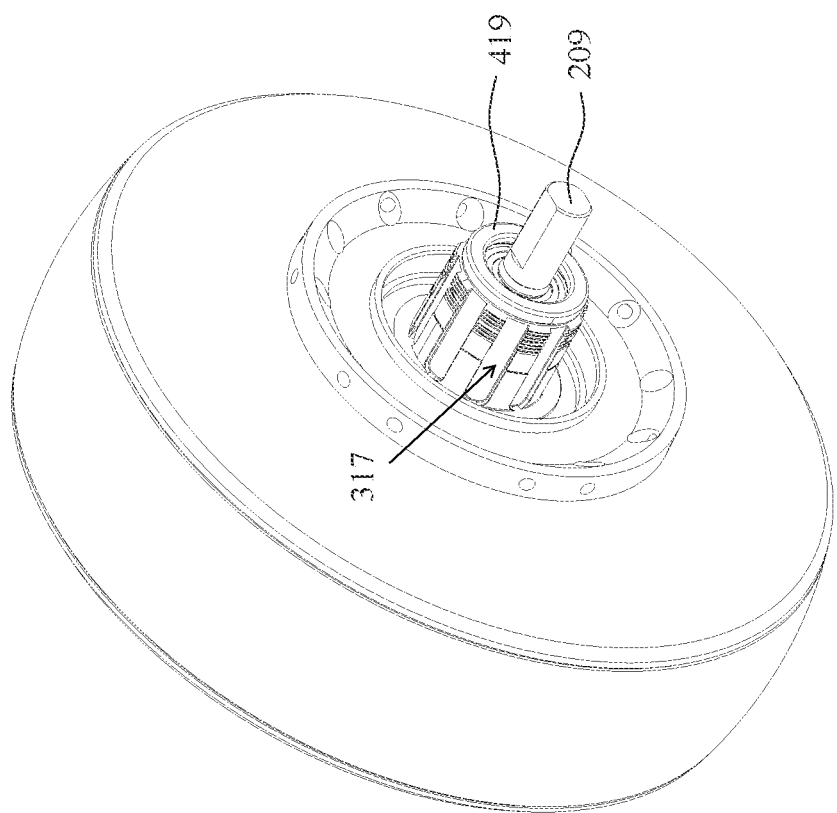

As shown in FIG. 3b, the first housing component 101 includes multiple paws 301 configured to engage an external torque sensor component 419. FIGS. 4a and 4b illustrate how the external torque sensor component 419 is coupled to the internal torque sensor component 317. As shown, the external torque sensor component 419 is positioned close to the shaft 209 first (e.g., by inserting the shaft 209 into an opening of the external torque sensor component 419) and then the external torque sensor component 419 is moved or slid toward the internal torque sensor component 317. The external torque sensor component 419 is configured to be positioned outside the internal torque sensor component 317.

As shown in FIG. 4a, the external torque sensor component 419 includes a ratchet gear 421 configured to engage the paw 301 such that the external torque sensor component 419 can be coupled to (and rotate with) the first housing component 101. The ratchet gear 421 enables the external torque sensor component 419 to rotate with the first housing component 101 in single rotational direction. The external torque sensor component 419 also includes a geared surface 423 configured to couple to a transmission component (e.g., a chain, a belt, a transmission gear set, etc.). The transmission component can further couple to a pedal for a user/rider to step on, such that the housing can be rotated by human power.

When a user steps on the pedal, the torque applied thereon can be transferred to the external torque sensor component 419. By measuring a relative rotation (e.g., by measuring a change of magnetic field) between the external torque sensor component 419 and the internal torque sensor component 317, a torque/force resulting from the user action can be sensed/measured. In some embodiments, the torque sensor can transmit a signal corresponding to the measurement to the controller on the main circuit board. In some embodiments, if the measured torque exceeds a threshold value, the hub apparatus 200 can respond by generating an additional torque to facilitate rotating the wheel coupled to the hub apparatus 200. For example, when the user rides on an uphill road, the user may need to push the pedal harder than usual. In such situation, the torque sensor can sense this change and inform the hub apparatus 200 to respond accordingly.

In some embodiments, the additional torque can be determined based on an average user riding or driving speed. For example, a user can have an average riding speed (e.g., can be determined based on various factors such as user riding history, user preferences, etc.) of 25 kilometers per hour when riding on a flat road. In this example, when the hub apparatus 200 determines that the user is riding on an uphill road (e.g., by sensing that the user steps harder on the pedal), the hub apparatus 200 can provide the additional torque so as to assist the user to ride at the average riding speed. In some embodiments, the additional torque can be generated to assist the user to ride at 50-99% of the user's average riding speed on uphill roads.

Figure 5:
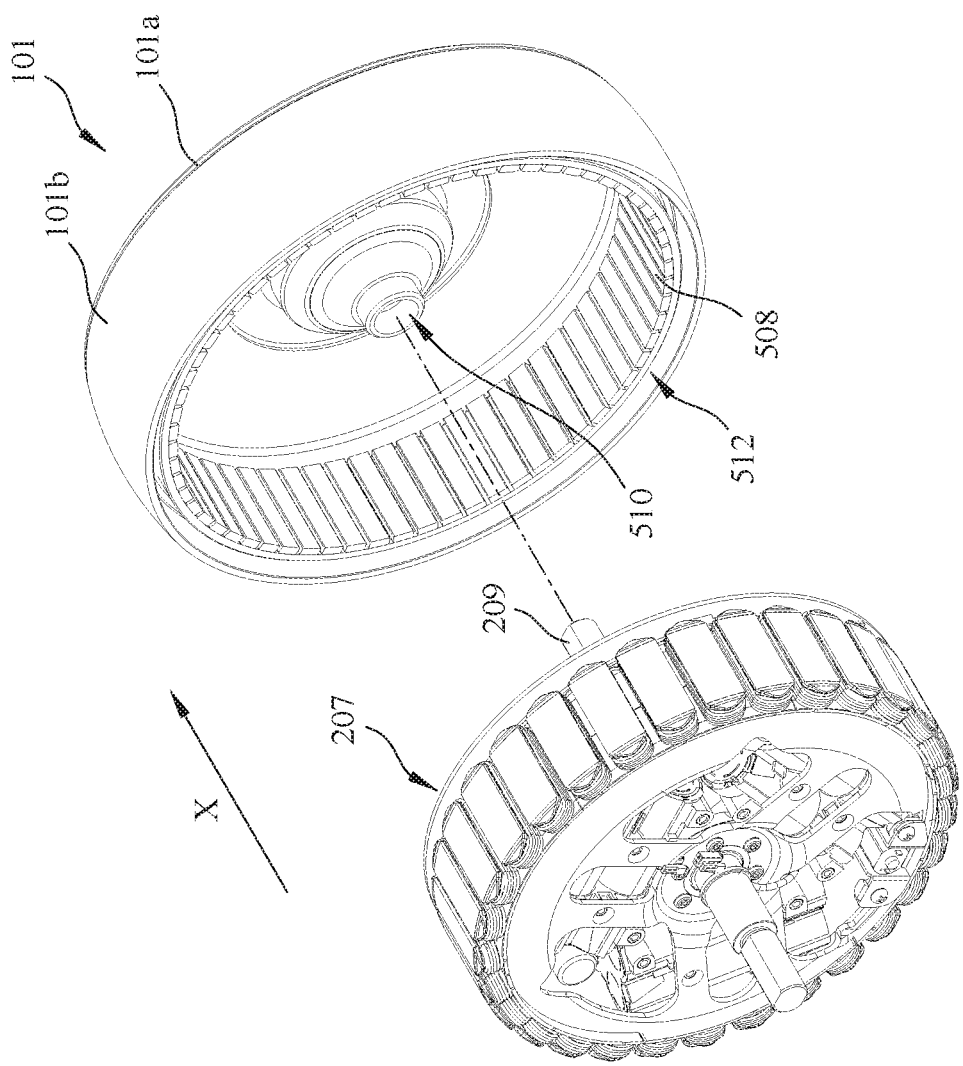
FIG. 5 illustrates an exploded view of a rotatable housing of a hub apparatus in accordance with embodiments of the present technology.

FIG. 5 illustrates how the stator assembly 208 is fitted within the first housing component 101 or the housing assembly. As shown, the stator assembly 208 is coupled to the shaft 209 and then the shaft 209 is positioned to pass through a center opening 510 of the first housing component 101 (in direction X, as indicated). As shown, multiple permanent magnets 508 are positioned on the interior or inner surface of the first housing component 101. During operation, the multiple permanent magnets 508 and the first housing component 101 can rotate (as a rotor assembly, along with the second housing component) relative to the stator assembly 208.

In some embodiments, the magnets 508 can be coupled to the first housing component 101 via a connecting structure (e.g., a metal ring). In some embodiments, the magnets 508 can be coupled to the sidewall 101a of the first housing component 101. In some embodiments, the magnets 508 can be coupled to the outer rim 101b of the first housing component 101.

As shown in FIG. 5, a gap 512 is formed between the magnets 508 and the first housing component 101. The gap 512 is configured to receive the insertion flange 2011 of the second housing component 201 (FIG. 2), such that the second housing component 201 and the first housing component 101 are fixedly coupled.

Figure 6A:
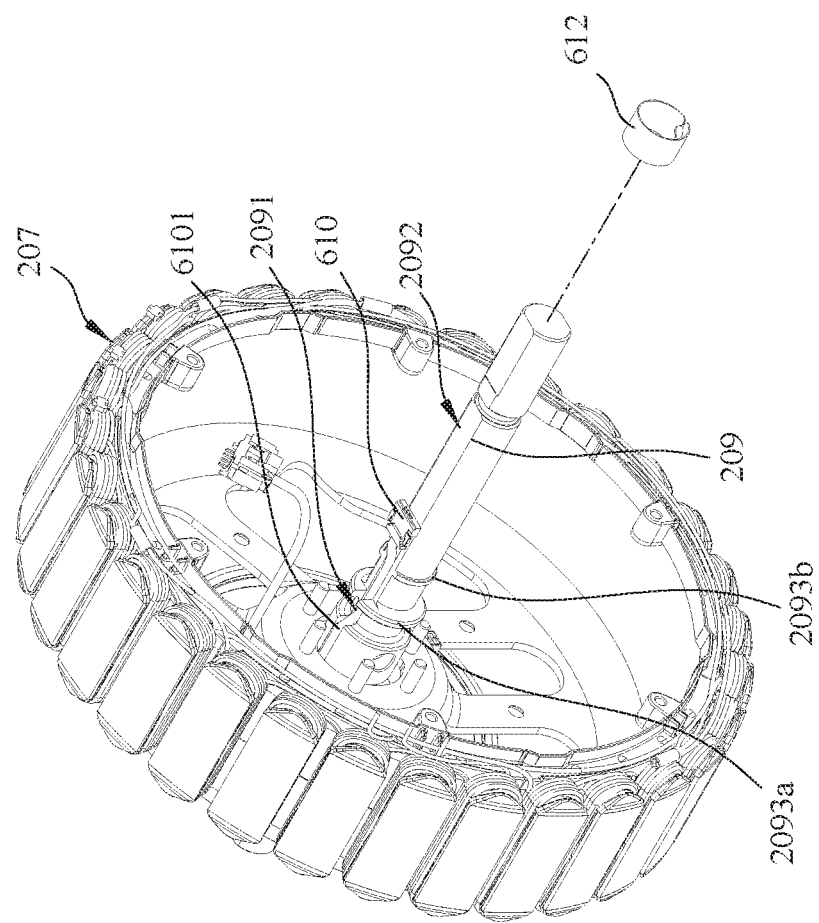
FIGS. 6a and 6b illustrate a protection sleeve in accordance with embodiments of the present technology.
Figure 6B:
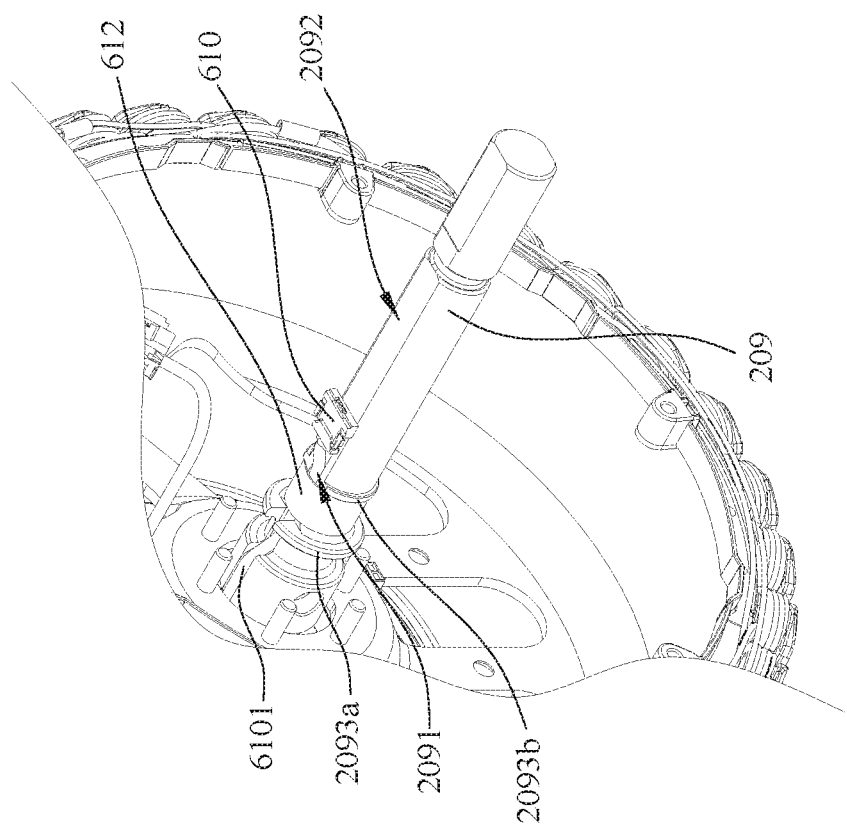

FIGS. 6a and 6b are isometric views showing a protection sleeve or wire clip 612 configured to secure the wires of a torque sensor to the shaft 209. As shown, the connector 610 has a flat shape. In the illustrated embodiments, the shaft 209 includes a flat surface 2092 and a circumferential recess 2091 located/formed thereon. The shaft 209 also includes two stopping walls 2093a-b radially extending from the center axis of the shaft 209 with a slot through which the torque wires are passed. The wires are pressed into the recess 2091 and held in place with the protection sleeve 612.

When a connector wire 6101 is positioned in the shaft recess 2091, the protection sleeve 612 can be positioned between the two stopping walls 2093a, 2093b. As a result, the connector wire 6101 is positioned in the shaft recess 2091 and the connector 610 is positioned on the flat surface 2092 such that the connector 610 can be readily connected to the internal torque sensor component 317 (FIGS. 3a and 3b). In some embodiments, the connector wire 6101 can be coupled to a controller (e.g., an ECU) positioned on the main circuit board 203.

FIG. 7 is an exploded view of a locking device 700 in accordance with embodiments of the present technology. The locking device 700 is configured to lock a motor (e.g., to prevent/impede a rotor assembly of the motor from rotating relative to a stator assembly of the motor) of a hub apparatus (e.g., the hub apparatus 100 illustrated in FIG. 1).

As shown in FIG. 7, the locking device 700 includes a stopper 701, a stopper holder 703, an actuator 705 coupled to a rod (or a screw/threaded rod) 707, and a plug 709 configured to connect wires of the actuator 705 to a controller that supplies current to move the rod 707. The stopper holder 703 is fixedly attached to the stationary part (e.g., a stator assembly) of an electric motor positioned inside the hub apparatus. The stopper 701 is positioned in the stopper holder 703 and is configured to be moved by the rod 707.

In some embodiments, a positioning component such as a threaded nut 711 is placed in an enclosure of the stopper 701 and biased with a spring 713. The rod 707 can be threaded and rotated by the actuator 705. The threaded rod 707 moves the nut 711 up and down on the threaded rod 707 to advance or retract the stopper 701 in and out of engagement with a surface on the rotor assembly (e.g., the housing assembly of the hub apparatus 200). In some embodiments, the actuator 705 can be an axial solenoid, or other actuators that moves the stopper 701.

In some embodiments, the spring 713 can be positioned to provide a resilient force to the stopper 701 to hold the stopper 701 to the nut 711 such that movement of the nut 711 relative to the rod 707 moves the stopper 701 toward or away from the inner surface of the housing assembly (e.g., the first housing component 101). In some embodiments, the stopper 701 can be positioned adjacent to the inner surface of the housing assembly without (actually) contacting it.

In some embodiments, the plug 709 can be coupled to a controller coupled to an electric control unit (ECU) and/or other suitable devices. In some embodiments, the ECU can lock/unlock the motor in response to a signal from an external device (e.g., a smartphone, a key fob, etc.). In some embodiments, the ECU can lock/unlock the motor without receiving a signal from an external device (e.g., a smartphone, a key fob, etc.) for a predetermined period of time (e.g., 10 minutes after the hub apparatus is turned off).

Figure 8:
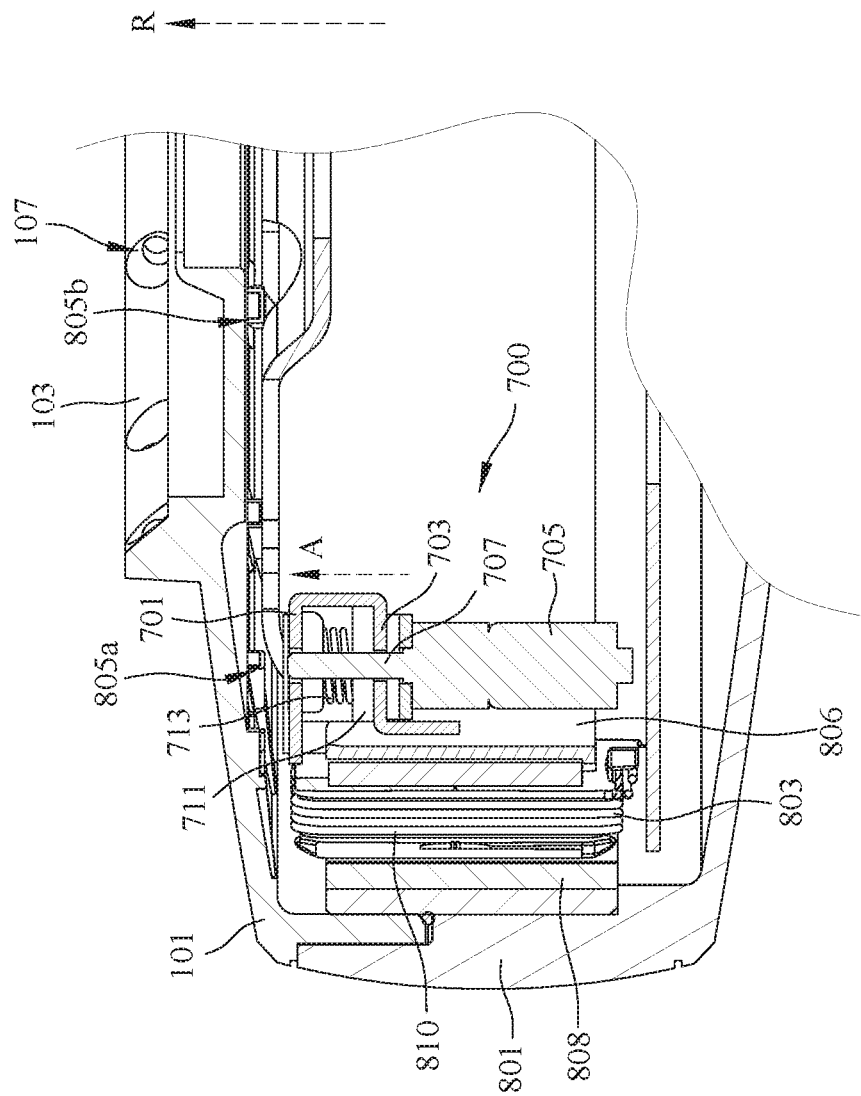

FIGS. 8-10b are sectional and isometric views of the locking device 700, showing the operation thereof. As shown, in FIGS. 8 and 9, the stopper holder 703 of the locking device 700 is fixedly coupled to a coil assembly 803 of the stator assembly such that a rotor assembly 801 is free to rotate (e.g., about axis R as indicated in FIG. 8) relative to the locking device 700.

In the illustrated embodiments shown in FIG. 8, the rotor assembly 801 includes the housing assembly and a number of magnets 808 attached thereto. In the illustrated embodiments, the coil assembly 803 includes a number of coils 810 and a chassis 806 (see also FIGS. 10a and 10b) configured to fixedly couple to the locking device 700. In the embodiments shown in FIG. 10a, the coils 810 can include a first set of coils 810a, a second set of coils 810b, and a third set of coils 810c. The first set of coils 810a is configured to be coupled to a battery pack (or other suitable components) via a first wire 810aa. The second set of coils 810b is configured to be coupled to the battery pack via a second wire 810bb. The third set of coils 810c is configured to be coupled to the battery pack via a third wire 810cc. The first, second and third sets of coils 810a-810c are circumferentially positioned around the chassis 806.

Figure 9:
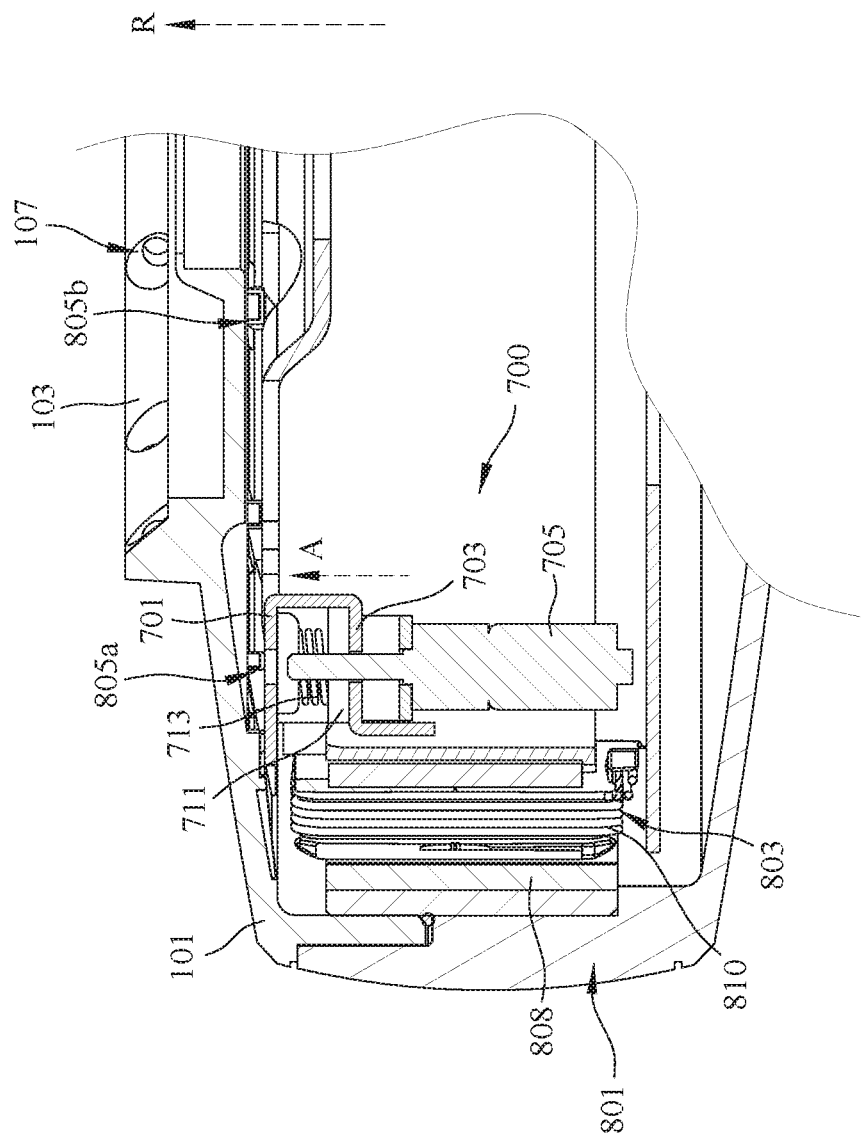

As shown in FIG. 8, two stopping bumps 805a, 805b are coupled to (or integrally formed with) the inner surface of the housing assembly. The stopping bumps 805a, 805b are configured to restrain the rotor assembly 801 (e.g., the housing assembly and the magnets 808) from rotating relative to the stopper 801 (which is fixed coupled to the coil assembly 803), when the stopper 701 is in an extended, "locked" position (e.g., as shown in FIGS. 9 and 10b).

Figure 10A:
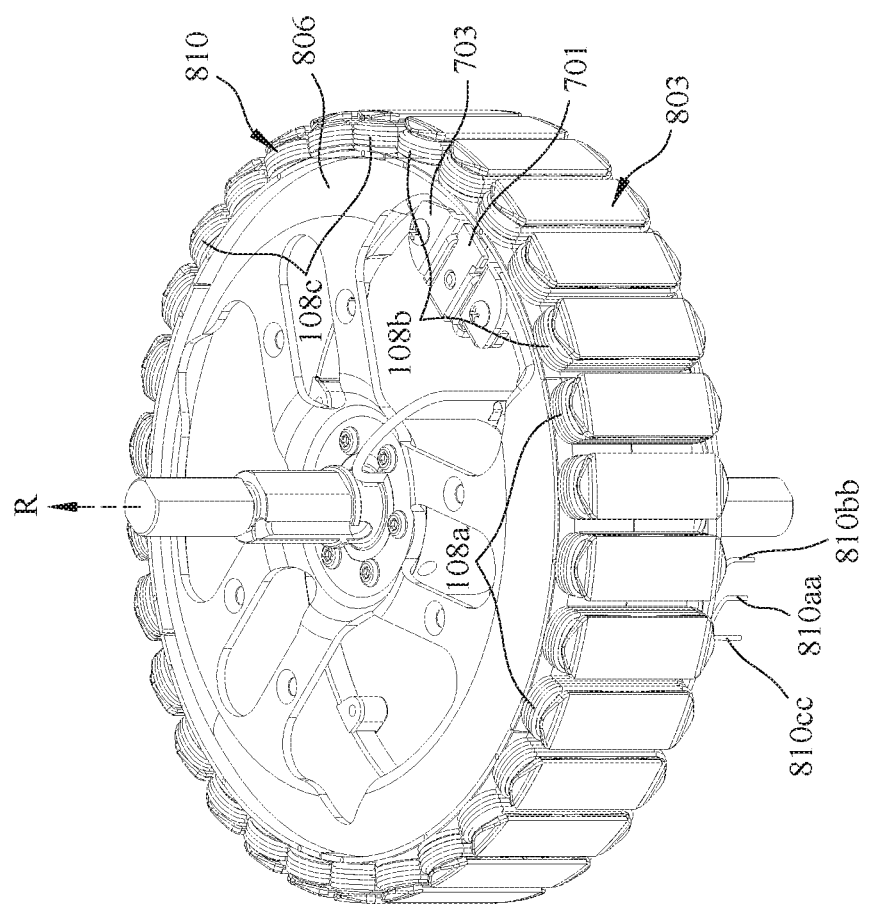
Figure 10B:
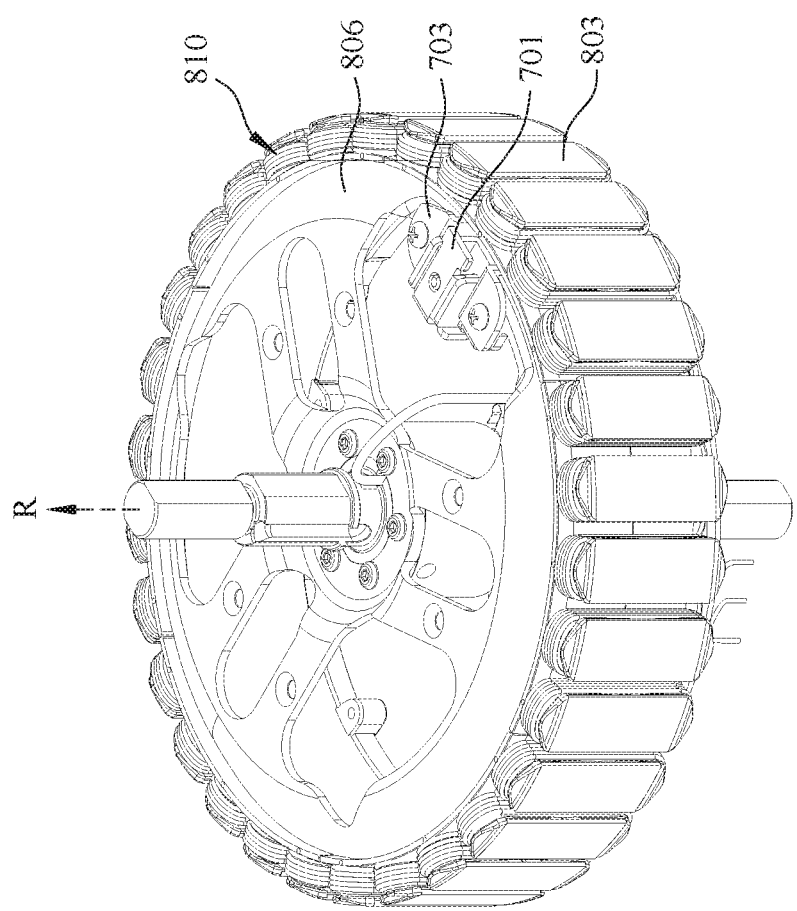

When the stopper 701 is retracted in an "unlocked" position (e.g., as shown in FIGS. 8 and 10a), the rotor assembly 801 can rotate relative to the stopper 701 (and the coil assembly 803). In some embodiments, there can be more than two stopping bumps 805 coupled to the housing assembly so that the wheel can be locked at a number of different positions.

In FIGS. 8 and 10a, the locking device 700 is in an "unlocked" position, and the rotor assembly 801 can rotate relative to the coil assembly 803. In such embodiments, (an edge of) the stopper 701 is flush with (an outer edge of) the stopper holder 703 and therefore the stopper 701 does not contact the stopping bump 805a, 805b when rotating.

When the ECU instructs the actuator 705 to rotate the rod 707 (e.g., to move the stopper 701 in direction A shown in FIGS. 8 and 9), the wheel is locked and unlocked accordingly.

Once the stopper 701 is moved toward the housing assembly (e.g., in direction A), as shown in FIGS. 9 and 10b, the stopper 701 is no longer flush with the stopper holder 703, and the locking device 700 is at a "locked" position. Accordingly, the stopper 701 is "stopped" or restrained by one of the stopping bumps 805a, 805b and cannot freely rotate relative to the rotor assembly 801. As a result, the rotor assembly 801 is locked and cannot rotate relative to the coil assembly 803.

In some embodiments, the stopping bumps can be circumferentially positioned at the inner surface of the housing assembly. In such embodiments, the stopper 701 can be stopped by any one of the stopping bumps. In some embodiments, the stopping bumps can be formed in various shapes such as, a protrusion, a block, and/or other suitable shapes that can be engaged the stopper 701 when it is in the extended position.

In some embodiments, the stopping bumps can be made of a relatively-easy replaceable material such as plastic, whereas the stopper 701 can be made of a relatively hard or stiff material. In such embodiments, when one or more of the stopping bumps 805 are damaged or have failed (e.g., caused by contacting the stopper 701), the rest of the stopping bumps can still engage the stopper 701 and lock the position of the rotor assembly 801. It is easy and convenient to replace a damaged stopping bump 805. As a result, the present technology provides a reliable, easy-to-maintain, mechanism to lock, stop, and/or control the rotation of an electric motor.

Figure 11:
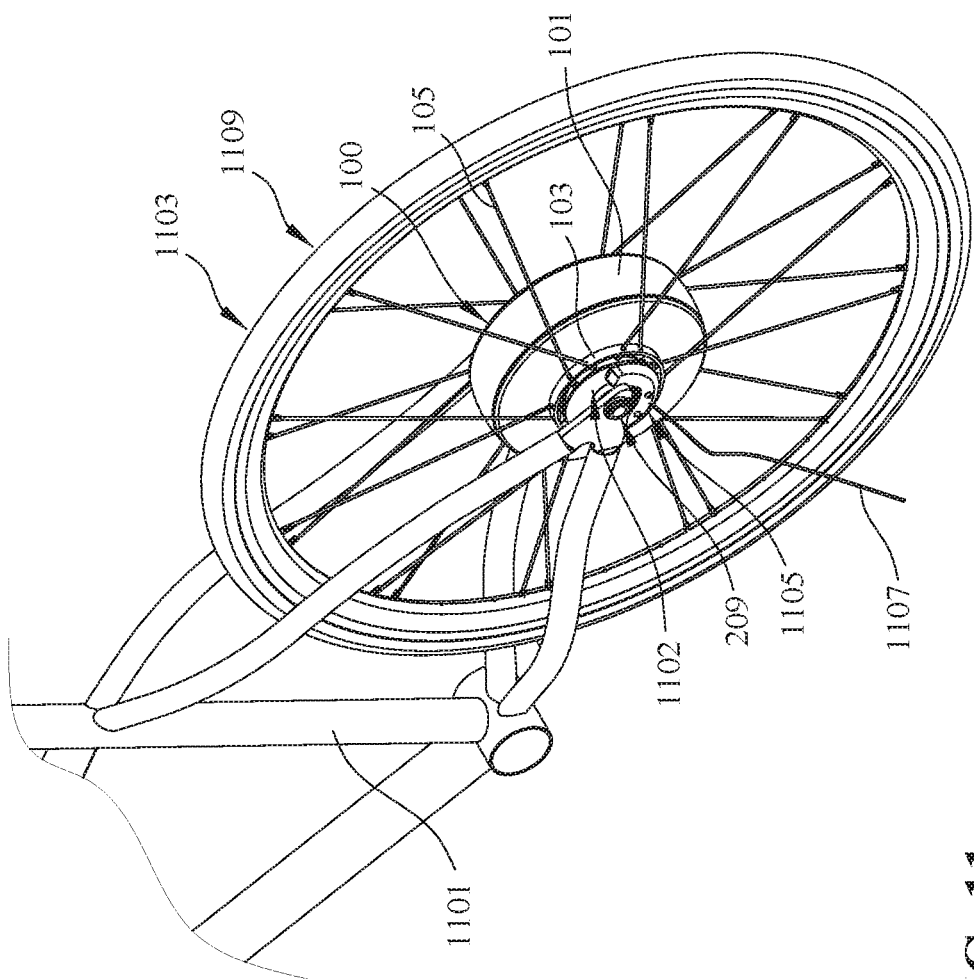
FIG. 11 illustrates a hub apparatus in accordance with embodiments of the present technology coupled to a wheel.

FIG. 11 is an isometric view of a vehicular frame 1101 supporting a hub apparatus 100 (or hub apparatus 200 in some embodiments) in accordance with embodiments of the present technology. As shown, the shaft 209 of the hub apparatus 100 is fixedly coupled to the vehicular frame 1101. The housing assembly of the hub apparatus 100 is coupled to a wheel 1103 via the spokes 105 and the ring structure 103 (as shown, a side cover 1102 can be attached to the hub apparatus 100). The wheel 1103 can be rotated by the hub apparatus 100 to move the vehicular frame 1101. When the wheel 1103 is not rotating, a charging head 1105 can be coupled to the hub apparatus 100 and charge the same. In some embodiments, the charging head 1105 can be coupled to the hub apparatus 100 by a magnetic force. As shown, the charging head 1105 can be coupled to a power source via a wire 1107. In some embodiments, the wheel 1103 can be a wheelset having a tire 1109, a wheel rim 1111, multiple spokes 105, and the hub apparatus 100.

In some embodiments, the hub apparatus in the present disclosure can include multiple controllers or processors configured to control the hub apparatus. For example, the hub can include a main controller (e.g., an electric control unit, ECU) configured to control the general operation (e.g., rotation) of the hub apparatus. In some embodiments, the main controller can be further "controlled" by a processor external to the hub apparatus (e.g., a processor in a user's smartphone). In some embodiments, the hub apparatus can include a secondary controller configured to control a particular component. For example, the secondary controller can be a motor control unit (MCU) configured to direct alternating currents (ACs) to the coils of a stator assembly. In some embodiments, the MCU can convert a direct current (DC) to multiple-phase ACs to the coils such that the coils can generate various electromagnetic fields to move the hub apparatus.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A hub apparatus, comprising:
a rotor assembly comprising—
a first housing component;
a second housing component positioned opposite to the first housing component, the first and the second housing components together define an internal space; and
a plurality of magnets mounted on one or both of the first and second housing components;
a shaft positioned to extend through the rotor assembly, the rotor assembly being rotatably coupled to the shaft; and
a stator assembly fixedly coupled to the shaft and positioned in the internal space, the stator assembly comprising—
a coil assembly fixedly coupled to shaft, the coil assembly being positioned corresponding to the magnets;
a main circuit board fixedly coupled to the coil assembly; and
a battery assembly positioned inside the coil assembly and carried by the main circuit board, the battery assembly including a plurality of battery packs circumferentially positioned about the shaft;
wherein the rotor assembly is configured to rotate relative to the stator assembly based on a signal from a controller carried by the main circuit board,
wherein the first and second housing components are configured to be tightly fitted with each other by an insertion flange formed on the second housing component, and wherein the insertion flange is configured to be inserted into a gap between the magnets and an inner circumferential surface of the first housing component.

2. The hub apparatus of claim 1, wherein the battery packs are positioned in a reference plane generally perpendicular to the shaft.

3. The hub apparatus of claim 1, wherein the coil assembly comprises a plurality of coils and a chassis, and wherein the plurality of coils are positioned on an outer circumferential surface of the chassis, and wherein the magnets are positioned on an inner circumferential surface of the first housing component opposite to the plurality of coils.

4. The hub apparatus of claim 3, wherein the battery assembly is positioned between the chassis and the main circuit board.

5. The hub apparatus of claim 4, wherein the main circuit board is positioned opposite to the chassis and adjacent to the first housing component.

6. The hub apparatus of claim 1, further comprising a torque sensor fixedly coupled to the shaft and rotatably coupled to the first housing component, wherein the torque sensor includes an internal torque sensor component and an external torque sensor component, and wherein the internal torque sensor component is fixedly coupled to the shaft, and wherein the external torque sensor component is rotatably coupled to the first housing component.

7. The hub apparatus of claim 6, wherein the torque sensor is configured to transmit a measured torque to the controller, and wherein if the controller determines the measure torque exceeds a threshold value, the controller instructs the hub apparatus to generate an additional torque to facilitate rotating a wheel coupled to the hub apparatus.

8. The hub apparatus of claim 6, further comprising an O-ring positioned adjacent to and around the torque sensor.

9. The hub apparatus of claim 6, further comprising a protection sleeve configured to secure a wire coupled to the torque sensor to the shaft.

10. The hub apparatus of claim 9, wherein the protection sleeve is positioned in a circumferential recess formed with the shaft.

11. The hub apparatus of claim 1, further comprising:
a locking mechanism configured to impede the rotor assembly from rotating relative to the stator assembly, the locking mechanism having at least one locking device provided on the stator assembly and at least one engaging portion provided on the rotor assembly;
wherein the locking device is activated, in response to a first signal from the controller, to engage the engaging portion; and
wherein the locking device is activated, in response to a second signal from the controller, to disengage from the engaging portion.

12. The hub apparatus of claim 11, wherein:
the locking device comprises a stopper, a stopper holder and an actuator, the stopper holder being fixedly coupled to the stator assembly, the stopper being positioned in the stopper holder, the stopper being configured to be moved by the actuator;
the engaging portion comprises a bump or a recess;
the actuator is configured to move, in response to the first signal from the controller, the stopper such that it engages the engaging portion; and
the actuator is configured to move, in response to the second signal from the controller, the stopper such that it disengages from the engaging portion.

13. A wheelset, comprising:
a tire;
a wheel rim configured to support the tire;
a plurality of spokes coupled to the wheel rim; and
a hub assembly coupled to the wheel rim by the spokes, the hub assembly comprising—
a housing having a side surface and a flange positioned on the side surface, the flange being coupled to the spokes;
a plurality of magnets positioned on an inner circumferential surface of a first housing component of the housing;
a shaft positioned to extend through the housing, the housing being rotatably coupled to the shaft;
a coil assembly positioned in the housing and fixedly coupled to shaft, the coil assembly being positioned corresponding to the plurality of magnets;
a main circuit board positioned in the housing and fixedly coupled to the coil assembly; and
a battery assembly positioned inside the coil assembly and carried by the main circuit board, the battery assembly including a plurality of battery packs circumferentially positioned about the shaft,
wherein the housing includes a second housing component configured to be tightly fitted with the first housing component by an insertion flange formed on the second housing component, and wherein the insertion flange is configured to be inserted into a gap between the magnets and the inner circumferential surface of the first housing component.

14. The wheelset of claim 13, wherein the battery packs are positioned in a reference plane generally perpendicular to the shaft.

15. The wheelset of claim 13, wherein the hub assembly further comprises a torque sensor coupled to the shaft and configured to measure a torque generated by a rotation of the housing, and wherein the torque sensor includes an internal torque sensor component and an external torque sensor component, and wherein internal torque sensor component is positioned between the shaft and the external torque sensor component, and wherein the rotation of the housing is measured based on a relative rotation between the external torque sensor component and the internal torque sensor component.

16. The wheelset of claim 15, wherein the hub assembly further comprises a protection sleeve configured to secure a wire coupled to the torque sensor to the shaft, and wherein the protection sleeve is positioned in a circumferential recess formed with the shaft.

17. The wheelset of claim 13, wherein the hub assembly further comprises:
a locking mechanism configured to impede the housing from rotating relative to the coil assembly, the main circuit board, and the battery assembly, the locking mechanism having a locking device and a bump positioned on the housing;
wherein the locking device is activated, in response to a first signal from the controller, to engage the housing; and
wherein the locking device is activated, in response to a second signal from the controller, to disengage from the housing.

18. A vehicle, comprising:
a vehicle frame;
a hub assembly coupled to the vehicle frame via a shaft of the hub assembly;
a wheel rim coupled to a housing of the hub assembly;
wherein the hub assembly comprises—
a plurality of magnets positioned on an inner circumferential surface of a first housing component of the housing;
a coil assembly positioned in the housing and fixedly coupled to shaft, the coil assembly being positioned corresponding to the plurality of magnets;
a main circuit board positioned in the housing and fixedly coupled to the coil assembly; and
a battery assembly positioned inside the coil assembly and carried by the main circuit board, the battery assembly including a plurality of battery packs circumferentially positioned about the shaft,
wherein the housing includes a second housing component configured to be tightly fitted with the first housing component by an insertion flange formed on the second housing component, and wherein the insertion flange is configured to be inserted into a gap between the magnets and the inner circumferential surface of the first housing component.

19. The vehicle of claim 18, wherein the coil assembly comprises a plurality of coils and a chassis, and wherein the plurality of coils are positioned on an outer circumferential surface of the chassis, and wherein the battery assembly is positioned between the chassis and the main circuit board, and wherein the main circuit board is positioned opposite to the chassis.

* * * * *